June 7, 1955   H. A. MANLEY   2,710,188
LOCKING MEANS FOR ELEMENTS OF A FILM DRIVING MECHANISM
Filed Oct. 1, 1953   2 Sheets-Sheet 1
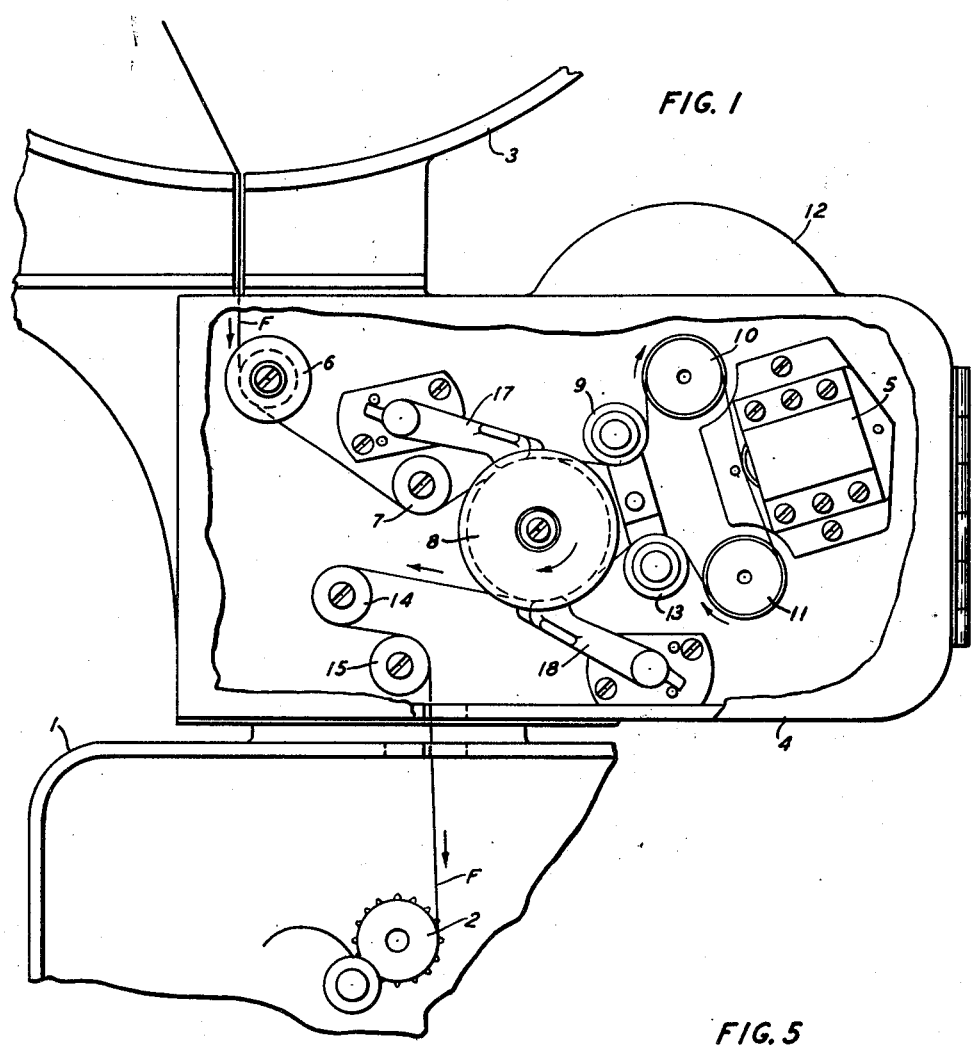
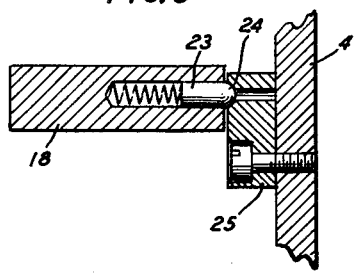
INVENTOR
H. A. MANLEY
BY
J. F. McEneany
ATTORNEY June 7, 1955　　　　　　H. A. MANLEY　　　　　　2,710,188
LOCKING MEANS FOR ELEMENTS OF A FILM DRIVING MECHANISM
Filed Oct. 1, 1953　　　　　　　　　　　　　　2 Sheets-Sheet 2

INVENTOR
H. A. MANLEY
BY
J. F. McEneany
ATTORNEY

United States Patent Office 2,710,188
Patented June 7, 1955

2,710,188

LOCKING MEANS FOR ELEMENTS OF A FILM DRIVING MECHANISM

Herbert A. Manley, Sherman Oaks, Calif., assignor, by mesne assignments, to Westrex Corporation, a corporation of Delaware Application October 1, 1953, Serial No. 383,592

3 Claims. (Cl. 271—2.3)

This invention relates to film driving mechanisms and particularly to improvements in means for arresting the movement of film driven elements of such film driving mechanisms.

The object of this invention is to provide a compact and relatively inexpensive means for arresting movement of film driven elements of a film driving mechanism to facilitate threading of the film therein.

Theatre reproduction of sound picture films bearing a multiple sound track, such as a stereophonic sound picture film, has necessitated modifications to existing theatre reproducing equipment. One modification to be described in this specification is in the form of an attachment for an existing theatre reproducer. In this attachment there is provided a multiple sound track reproducing means, a mechanical filtering means for suppressing irregularities in the forward motion of the film at the reproducing means and a toothed drum or sprocket for guiding the film to and from the mechanical filtering means. This guiding means is rotatable on a fixed shaft and is driven by the film which is, in turn, driven by a driving element of the picture projector mechanism. There is provided a film-retaining arm which is operable in one position to engage and retain the film on the guiding drum or sprocket and movable to a second position out of engagement with the sprocket to permit threading of the film thereon.

Difficulties have been encountered in properly threading a film through the above-described attachment with the required length or loop of film disposed between the first and second points of film contact with the guiding drum or sprocket. It has been necessary for an operator to use one hand to hold the sprocket against rotation, while he endeavors with the other hand to properly thread the film over the elements of the mechanical filtering system and past the sound reproducing means.

In accordance with this invention, applicant provides means facilitating threading of the film, the means being in the form of a locking arrangement for the guiding sprocket. The locking arrangement is released by movement of another element of the film drive to its normal position to engage the film during movement thereof. Specifically, the internal surface of one flange of the film driven guiding sprocket is provided with gear teeth which are engaged by a spring-urged pawl mounted in a fixed guide disposed radially of the sprocket. The means provided for retaining the film on the sprocket surface during the running of the film carries a projection which contacts and exerts a force on the locking pawl sufficient to remove it from contact with the toothed surface of the sprocket when the retaining means is in film-engaging position.

The invention will be more clearly understood by reference to he following specification when read in connection with the accompanying drawings in which:

Fig. 1 is a front elevation of a sound reproducing attachment in accordance with this invention;

Figure 2:
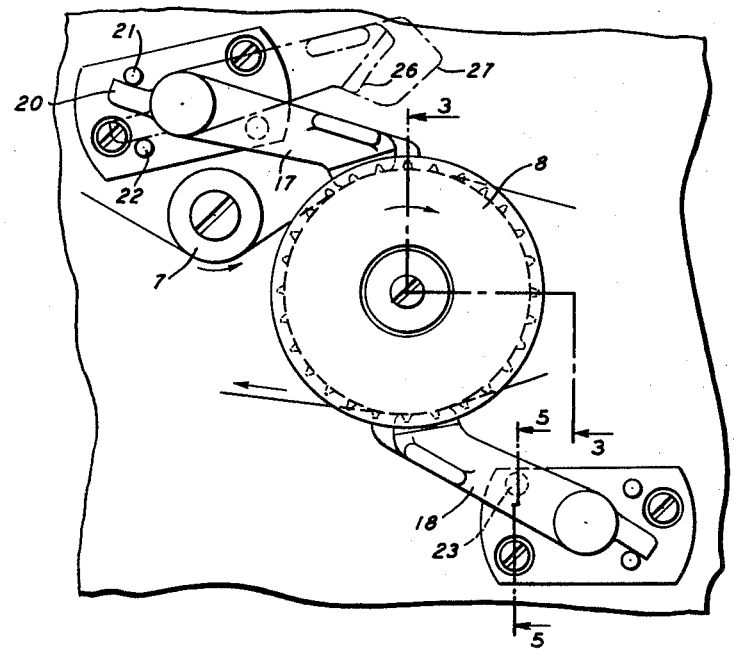
Fig. 2 is an enlarged view of the film driven guiding sprocket and the film-retaining means associated therewith.
Figure 3:
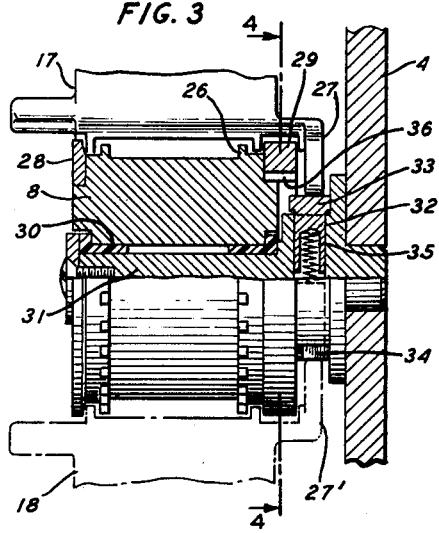
Figure 4:
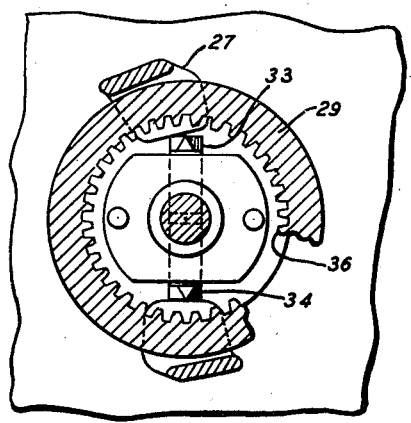

Fig. 3 is a section taken through line 3—3 of Fig. 2;
Fig. 4 is a section taken through line 4—4 of Fig. 3; and Fig. 5 is a section taken through line 5—5 of Fig. 2.

Referring to Fig. 1, numeral 1 indicates a housing of an existing picture projecting apparatus containing a film driving sprocket 2 which engages and produces motion of the film F in the direction indicated by the arrow. Numeral 3 indicates a supply reel for the film F. A detachable housing 4, located between the supply reel 3 and the projector housing 1, contains film guiding and filtering means for drawing the film past a multiple magnetic head 5.

The film F passes from supply reel 3 over a rotatable guide roller 6 to a second rotatable guide roller 7. The film then engages a freely rotatable guide sprocket 8 from which it passes to one roller 9 of a mechanical filtering unit of the type disclosed in United States Patent 2,562,379 July 31, 1951 to C. C. Davis. From roller 9, the film is guided by rollers 10 and 11 past the multiple magnetic head 5. The shafts suporting each of the film driven rollers 10 and 11 are each provided with an inertia means in the form of a flywheel, one of which is shown at 12. From roller 11 the film passes to and engages a second roller 13 of the mechanical filtering unit. The film then engages the underpart of guide sprocket 8 and is directed in a curved path to the driving sprocket 2 by film driven rollers 14 and 15.

A pivoted film-retaining arm 17 engages and retains the film on top surface of guide sprocket 8. This retaining arm is movable out of film-engaging position to permit threading of the film over the guide sprocket 8. A similar film-retaining arm 18 is provided to engage and retain the film on the lower portion of guide sprocket 8.

It is necessary to the proper operation of the sound drive that the filter rollers 9 and 13 be in a particular position with respect to each other and to the guide sprocket 8. It is, therefore, necessary to carefully thread a film loop of predetermined length from the first point of contact with guide sprocket 8 around rollers 9, 10, 11 and 13 to the second point of contact of the film with guide sprocket 8. It will be apparent that, with the sprocket 8 free to rotate on its support, it is difficult to properly thread the film in the unit 4.

In accordance with this invention, means are provided for automatically locking the guide sprocket 8 against rotation when the retaining arms 17 and 18 are moved out of contact with the sprocket 8 during a film threading operation. Also, in accordance with the invention, means are provided to insure that the locking means is released once the threading is accomplished and the film drive is ready for operation.

It is necessary prior to the commencement of film drive to move the film-retaining means 17 and 18 to the position as shown in Fig. 1, wherein they are in engagement with the film on guide sprocket 8. Therefore, in accordance with the invention, applicant provides locking means operable to locking position when the film-retaining arms are moved out of engagement with the sprocket and operable to non-locking position by movement of the retaining arms to engage the film on the sprocket 8.

Referring to Fig. 2, retaining arm 17 is provided with a projection 20 which engages stop 21 when the arm 17 is in film-engaging position and engages stop 22 when this arm is in non-film engaging position, as shown by the dotted lines in the upper portion of Fig. 2. Similar stops are provided for arm 18. The arms 17 and 18 are held in film-engaging position by means of a projection 23 which is spring-urged into depression 24 in element 25, as shown in detail in Fig. 5. The retaining arms 17 and 18 are each provided with film-engaging surfaces 26 and with an integral projection 27.

Referring to Figs. 3 and 4, the guide sprocket 8 is provided with flanges 28 and 29. These flanges engage the marginal edges of the film F on the sprocket 8. Guide sprocket 8 rotates on a bearing 30 which is secured to a fixed shaft 31 supported by housing 4. A central boring 32 in shaft 31 provides a guide for pawls 33 and 34. Pawls 33 and 34 are resiliently urged outwardly radially of the guide sprocket 8 by coil spring 35.

The inner surface of flange 29 is provided with teeth, as indicated at 36, Fig. 4. This flange is affixed to and rotatable with guide sprocket 8. When the toothed surface 36 of flange 29 is engaged by pawls 33 and 34, the guide sprocket 8 will be locked against rotation on shaft 31. The integral projection 27 of retaining arm 17 engages and exerts a force on pawl 33 sufficient to force it out of engagement with flange 29 when the retaining arm 17 is in film-engaging position. A similar flange 27 on retaining arm 18 moves pawl 34 out of engagement with flange 29.

Therefore, when the retaining arms 17 and 18 are moved to non-film engaging position to permit threading of the film F through the attachment 4, the guide sprocket 8 will be locked against rotation to facilitate the threading of the film around the elements of the film drive. When the film is threaded through the machine and it is in condition for operation with the retaining rollers 17 and 18 in film-engaging position, the locking pawls are released, to thus permit free rotation of guide sprocket 8.

The tension of the pawl spring 35 is selected so that at a film tension safely below the breaking point of the film F, the pawls will slip over the gear teeth 36. This insures against a film breakage should the operator neglect to close both retaining arms to film-engaging position before starting the film drive mechanism. In this situation, the noise of the slipping pawl will warn the operator that both retaining arms have not been closed to film-engaging position.

What is claimed is:

1. The combination in a film drive having means producing forward motion of said film, a freely rotatable guiding sprocket engaged by said moving film, film-retaining means movable to a first position to engage said film at the surface of said sprocket to retain said film on said sprocket, said film-retaining means being mounted for movement to a second position out of engagement with said film to permit threading of said film on said sprocket, means automatically operable to lock said sprocket against rotation when said film-retaining means is in its said second position and means operable by movement of said film-retaining means to its said first position to release said sprocket locking means.

2. In combination in a film driving mechanism, means producing movement of said film, a freely rotatable film guiding sprocket in engagement with said film, retaining means engaging said film on said sprocket, said retaining means being movable to a non-film engaging position to permit threading of said film on said sprocket, means for arresting rotation of said sprocket when said film-retaining means is in non-film engaging position, said means comprising a toothed element affixed to and rotatable with said sprocket and a locking element movable into and out of engagement with said toothed element and means forming part of said retaining means and operable when said retaining means is in film-engaging position to move said locking element out of engagement with said toothed element.

3. In combination in a film drive, means producing forward motion of said film, filter means engaging said film and operable to suppress irregularities in the forward motion thereof, a freely rotatable sprocket adapted to engage said film in its passage to and from said filter means, retaining means operable in one of two positions to engage and retain said film on said sprocket, means for locking said sprocket against rotation comprising a toothed element affixed to said sprocket and a spring-urged pawl disposed for movement from a fixed support to engage said toothed element, said pawl being movable to non-engagement with said toothed element by movement of said film-retaining means to film-engaging position.

References Cited in the file of this patent

UNITED STATES PATENTS 2,674,454     Mennecke _____ Apr. 6, 1954

FOREIGN PATENTS 623,814     Germany _____ Jan. 4, 1936